United States Patent
Jiang (10) Patent No.: US 12,305,656 B2
(45) Date of Patent: May 20, 2025

(54) MANUAL-ADJUSTMENT-TYPE DEVICE FOR ADJUSTING SWING ANGLE OF ELECTRIC FAN ACCORDING TO IDENTIFICATIONS

(71) Applicant: Liangjian Jiang, Guangzhou (CN)

(72) Inventor: Liangjian Jiang, Guangzhou (CN)

(*) Notice: Subject to any disclaimer, the term of this patent is extended or adjusted under 35 U.S.C. 154(b) by 73 days.

(21) Appl. No.: 18/548,941

(22) PCT Filed: Jun. 11, 2021

(86) PCT No.: PCT/CN2021/099568
§ 371 (c)(1),
(2) Date: Sep. 5, 2023

(87) PCT Pub. No.: WO2022/193451
PCT Pub. Date: Sep. 22, 2022

(65) Prior Publication Data
US 2024/0151236 A1    May 9, 2024

(30) Foreign Application Priority Data
Mar. 15, 2021    (CN) .......................... 202110283371.5

(51) Int. Cl.
*F04D 25/10* (2006.01)
*F04D 29/00* (2006.01)
(Continued)

(52) U.S. Cl.
CPC ........... *F04D 25/105* (2013.01); *F04D 29/00* (2013.01); *F16H 37/12* (2013.01); *F04D 25/06* (2013.01)

(58) Field of Classification Search
CPC ........ F04D 25/10; F04D 25/105; F04D 29/00; F16H 37/12
See application file for complete search history.

(56) References Cited

U.S. PATENT DOCUMENTS

| | | | |
|---|---|---|---|
| 3,481,533 A | * | 12/1969 | Achill ................... F04D 25/105 |
| | | | 310/46 |
| 3,625,633 A | * | 12/1971 | Nelson .................... F16D 11/00 |
| | | | 416/169 R |
| 2008/0206053 A1 | | 8/2008 | Sagucio |

FOREIGN PATENT DOCUMENTS

| CN | 87203864 | 2/1988 |
|---|---|---|
| CN | 2340956 | 9/1999 |

(Continued)

OTHER PUBLICATIONS

JP-3094886-U, published Jul. 4, 2003 (Year: 2003).*

*Primary Examiner* — David E Sosnowski
*Assistant Examiner* — Jason G Davis
(74) *Attorney, Agent, or Firm* — JMB Davis Ben-David (57) ABSTRACT

A manual-adjustment-type device for adjusting the swing angle of an electric fan according to identifications, the device comprising an identification disc, an angle adjustment knob and a sliding slot-sliding block crank adjustment mechanism. A limiting slot-limiting block mechanism is arranged between the identification disc and the angle adjustment knob; an inner wall of a second inner cavity of the sliding block is provided with a rack, an outer wall of the sliding block is provided with graded recessed and protruding bodies, and the center distance between the graded recessed and protruding bodies is equal to the pitch of the rack; a first limiting sliding slot is provided with a notch, and a spring-setter device is arranged at the notch and is in elastic setting contact with the graded recessed and protruding bodies; the lower end face of the sliding block is provided with an overlapped protruding block, and the overlapped protruding block is arranged in an extending sliding slot arranged at an edge of a second limiting sliding slot of a limiting cover, so as to form a sliding fit therebetween; and an inverted protruding block-through hole snap- (Continued)

fitting contact combined structure is arranged between the angle adjustment knob and a bidirectional connection block. Thus the manual-adjustment-type device for adjusting the swing angle of an electric fan according to identifications is formed; and by means of the device, gear damage can be avoided, the angle can be adjusted accurately and equally according to identifications of the identification disc, and the angle adjustment knob is prevented from becoming loose and falling off.

8 Claims, 8 Drawing Sheets

(51) Int. Cl.
*F16H 37/12* (2006.01)
*F04D 25/06* (2006.01)

(56) References Cited

FOREIGN PATENT DOCUMENTS

| | | |
|---|---|---|
| CN | 2379627 | 5/2000 |
| CN | 2643035 | 9/2004 |
| CN | 1690442 | 11/2005 |
| CN | 201706633 | 1/2011 |
| CN | 205943892 | 2/2017 |
| CN | 207234052 | 4/2018 |
| CN | 109758624 | 5/2019 |
| CN | 112228371 | 1/2021 |
| CN | 212676165 | 3/2021 |
| CN | 113153797 | 7/2021 |
| GB | 186429 | 10/1922 |
| JP | S5656997 | 5/1981 |
| JP | 3094886 U * | 7/2003 |
| TW | 200632222 | 9/2006 |

* cited by examiner

MANUAL-ADJUSTMENT-TYPE DEVICE FOR ADJUSTING SWING ANGLE OF ELECTRIC FAN ACCORDING TO IDENTIFICATIONS

CROSS-REFERENCE TO RELATED APPLICATIONS

This is the U.S. National Stage of International Patent Application No. PCT/CN2021/099568 filed on Jun. 11, 2021, which in turn claims the benefit of Chinese Patent Application No. 202110283371.5 filed on Mar. 15, 2021.

FIELD OF THE INVENTION

The present disclosure relates to electric fan devices, and more particularly to a manual-adjustment-type device for adjusting a swing angle of an electric fan according to identifications.

BACKGROUND OF THE INVENTION

In the prior art, a swing angle of an electric fan with an adjustable swing angle is mainly adjusted by changing the length of the crank in a crank rocker mechanism. In the prior art 1 of Chinese Patent No. 99236154.0, a device for adjusting a swing angle of an electric fan with quantitative identifications is disclosed. Limiting sliding slot-sliding block-rack-crank is provided in a large gear and engaged with a mandrel gear to form a variable-length crank mechanism, a large circular wheel with a dial is provided outside a hollow shaft extending out of a motor shell, an angle adjustment knob is provided outside the mandrel extending out of the motor shell, and an elastic setter contact device is provided between the angle adjustment knob and the large circular wheel. The user can twist the angle adjustment knob according to identifications on the dial of the large circular wheel to drive the sliding block-rack-crank to make equivalent variable-length displacement according to the identifications to obtain an air supply swing angle of any angle. However, the reciprocating variable-length crank mechanism, formed by meshing of the limiting sliding slot-sliding block-rack-crank provided in the large gear and the mandrel gear, is an internal-limiting blocking structure in which blocking surfaces of limiting ends are provided at two reciprocating ends of the sliding slot. Once a user twists the angle adjustment knob in a wrong direction or twists with too much force, the mandrel gear and the rack collide with the blocking surfaces of the limiting ends and are blocked to generate an overshoot torque, and the gear teeth will be worn off, resulting in a failure of angle adjustment. In addition, the assembly structure that "a shaped hole is arranged in the large circular wheel, a spring device is provided in the hole, and the spring device is assembled with recessed and protruding bodies of the angle adjustment knob to form an elastic close contact" is a spare part-type secondary assembly production process, in which the spring spare parts are left to the electric fan assembly production line and are subsequently installed until the motor shell has been installed. The structure has the disadvantage of significantly violating the safety regulations and industry regulations of the electric fan manufacturing industry.

In view of the above disadvantages, in the prior art 2 of Chinese Patent Application No. 202011159133.5, a manual-adjustment-type device for adjusting a swing angle of an electric fan according to two-way hierarchical identifications is disclosed. A rotary adjustable crank structure with 360° bidirectional non-blocking rotation, which is composed of eccentric gear-disk-crank and a central (shaft) gear, is provided in the inner cavity of a large gear. An identification disc relay connection device with a starting point reference, having a unique position, and being manually detachable is provided between the hollow shaft and the identification disc. A angle adjustment knob relay connection device with a starting point positioning, which can perform 360° bidirectional non-blocking rotation with respect to the identification disc and is manually detachable, is provided between the central shaft and the angle adjustment knob to establish a manual-adjustment-type device for adjusting a swing angle according to two-way hierarchical identifications which can change the -displacement length of the eccentric distance of the eccentric gear-disk-crank in a bidirectional 360° non-blocking rotary manner according to the bidirectional hierarchical identification indication, thus not only eliminating the wear of the gear teeth of the rack of the sliding block and the mandrel gear in the prior art 1, but also solving the problem of reliably completing the assembly of the identification disc and the angle adjustment knob by the production process complying with industry regulations. The user can quickly and reliably adjust the angle according to the bidirectional hierarchical identifications on the identification disc outside the electric fan. However, since there is a non-linear functional displacement relationship between the displacement length track of the eccentric distance of the rotary crank generated by the central (shaft) gear driving the rotation of the eccentric gear disk crank and the angular displacement track of twisting the central shaft according to the average identification of the identification disc relative to the angle adjustment knob. When the angle adjustment knob is located at the inflection point identification in the identification disc or is twisted to be closer to the zero point identification in the identification disc, the smaller the change of the displacement length of the rotary eccentric distance made by the eccentric gear crank driven by the angle adjustment knob; and vice versa, when the angle adjustment knob is twisted to be closer to the middle section identification of the inflection point and the zero point in the identification disc, the greater the change of the displacement length of the rotary eccentric distance made by the eccentric gear crank driven by the angle adjustment knob. There is an inequivalent displacement difference between the displacement length change of the eccentric distance of the rotary crank generated by the central (shaft) gear driving the 360° rotation of the eccentric gear disk crank and the average identification displayed on each grade of the identification disc, which is easy to mislead the user to deviate from a preset value when operating, and has the disadvantage of inaccurate angle adjustment.

SUMMARY OF THE INVENTION

In order to solve the technical problems, the present disclosure provides a manual-adjustment-type device for adjusting a swing angle of an electric fan according to identifications, by which the wear of gear teeth can be avoided and the angle can be adjusted accurately and equally according to identifications on the identification disc during the manual-adjustment-type angle adjustment.

In order to solve the above technical problems, the manual-adjustment-type device for adjusting a swing angle of an electric fan according to identifications of the present disclosure includes a motor shell, an identification disc, an angle adjustment knob, a housing provided with a worm shaft sleeve and a lower shaft sleeve, a housing cover provided with an upper shaft sleeve, a two-grade reduction mechanism, a hollow shaft, and a central shaft. A second-grade reduction mechanism of the two-grade reduction mechanism includes a worm gear and a large gear, the large gear is provided with a first inner cavity, the first inner cavity is provided with a crank adjustment mechanism composed of a first limiting sliding slot, a sliding block, a rack, a crank, and a central gear, and an angular displacement of each grade identification provided on the identification disc is equal to an angular displacement of each tooth of the central gear; a hollow shaft; and a central shaft. A circular iterative step is provided on an upper end of the hollow shaft, and an identification disc relay connection device with a unique positioning connection is arranged between the hollow shaft and the identification disc. An angle adjustment knob relay connection device with a unique positioning connection is arranged between the central shaft and the angle adjustment knob, and the angle adjustment knob relay connection device includes a bidirectional connection block fixedly mounted on an upper end of the central shaft with a screw. A lower end of the large gear is provided with a limiting cover, the limiting cover is provided with a second limiting sliding slot, and the crank passes through the second limiting sliding slot to an outside of the large gear. A limiting slot-limiting block mechanism is arranged between the identification disc and the angle adjustment knob, the limiting slot-limiting block mechanism includes a circular arc limiting slot formed on the identification disc and a limiting block provided on the angle adjustment knob, the limiting block is inserted into the limiting slot, and a given limiting stroke of the limiting slot is equal to an effective limiting stroke of a given identification of the identification disc.

By additionally providing the limiting slot-limiting block mechanism between the identification disc and the angle adjustment knob, an internal-limiting blocking mechanism with the given limiting stroke is formed to replace a full-rotation non-blocking mechanism between an angle adjustment knob and a large round wheel in the prior art. During the angle adjustment, once the user twists the angle adjustment knob with too much force or mistakenly operates in an opposite direction, the central gear on a lower end of the central shaft and the rack of the sliding block will meet a blocking surface of a limiting end of the first limiting sliding slot, and at this time, the limiting block of the torsion input angle adjustment knob firstly firmly blocks the angle adjustment knob on a given limiting end surface of the limiting slot of the identification disc so as to stop the angle adjustment knob and synchronously stop the overshoot action displacement of the central gear at the lower ends of the central shaft and the hollow shaft and the rack of the sliding block, thereby completely eliminating the wear of gear teeth between the central gear and the rack of the sliding block caused by excessive force or disoperation for twisting the angle adjustment knob in the structural arrangement.

The sliding block is provided with a second inner cavity, an inner wall of the second inner cavity is provided with the rack, and the central gear is inserted into the second inner cavity and engaged with the rack. An outer wall of the sliding block is provided with graded recessed and protruding bodies, and the center distance between the graded recessed and protruding bodies is equal to a pitch of teeth of the rack. A top end of the graded recessed and protruding bodies is in a sliding fit with a slot wall of the first limiting sliding slot, and the slot wall of the first limiting sliding slot is provided with a notch. A spring-first setter device is provided in the first inner cavity of the large gear, the setter passes through the notch and is in elastic setting contact with the graded recessed and protruding bodies. One end of the setter is a first circular arc rib and another end of the setter is a square block, and the first circular arc rib of the setter passes through the notch and is in elastic setting contact with the graded recessed and protruding bodies.

By additionally providing a row of graded recessed and protruding bodies with the center distance equal to the pitch of teeth of the rack on the outer wall of the sliding block, breaking a middle section of the conventional slot wall of the first limiting sliding slot and providing the notch thereon, and additionally providing an elastic setter device at the notch to press the graded recessed and protruding bodies in an elastic setting contact manner, the sliding block-rack-crank can only be set and displaced in the first limiting sliding slot according to the set center distance between the graded recessed and protruding bodies, thus forming a reciprocating sliding block-rack-crank variable-length adjustment mechanism with the graded recessed and protruding bodies defining the displacement track. Since the center distance between the graded recessed and protruding bodies is equal to the pitch of teeth of the rack of the sliding block, the pitch of teeth of the rack of the sliding block is equal to a pitch of teeth of the central gear, and the angular displacement of each tooth of the central gear is equal to the angular displacement of each grade identification on the identification disc, the manual-adjustment-type device for adjusting a swing angle of an electric fan according to identifications is formed, by which the actual displacement length of the eccentric distance of the sliding block, the rack, and the crank can be adjusted accurately and equally according to a given grade identification of the identification disc.

A stepped protruding block is provided between a lower end surface of the sliding block and the crank, an extending sliding slot is formed along the second limiting sliding slot on the limiting cover, and the stepped protruding block is inserted into the extending sliding slot to form a sliding fit. By additionally providing the stepped protruding block between the lower end surface of the sliding block and the crank, additionally providing the extending sliding slot along the second limiting sliding slot on the limiting cover, and inserting the stepped protruding block into the extending sliding slot to form a sliding fit, a single sliding block-double plane-double sliding slot linear guide snap-fitting structure, which includes first limiting sliding slot-sliding block and extending sliding slot-stepped protruding block, is formed in the sliding block-rack-crank variable-length adjustment mechanism, thereby enhancing the vertical stability of the snap fitting of the crank, reducing the influence of the transverse torsion of the central gear during the angle adjustment, and improving the impact resistance of the crank against external impacts.

A circular arc reinforcing sleeve is provided in a lower section wall of the worm shaft sleeve of the housing along the non-engaging portion of the addendum-circle surface of the worm gear, and a circular arc surface of the circular arc reinforcing sleeve is in a movable fit with the corresponding addendum-circle surface of the worm gear. In this way, the engaging stability of the worm gear with the large gear is enhanced. The problem that the engagement of the worm gear with the large gear is of low stability due to a distal end thereof being single-ended cantilevered so that the instability and slipping of the engagement are easily generated during the manual-twisting angle adjustment is solved. Thus, the manual-adjustment-type device for adjusting a swing angle of an electric fan according to identifications maintains good power transmission performance and smooth and accurate angle adjustment function during operation.

As a preferable structure of the above relay connection device of the angle adjustment knob, a shaft body of the angle adjustment knob is provided with a symmetrically shaped groove and asymmetrically shaped grooves, and a through hole is arranged on the shaft body of at symmetrically shaped groove; a cylinder body of the above bidirectional connection block is provided with a symmetrically shaped rib and asymmetrically shaped ribs, and an inverted protruding block is provided in the corresponding through hole of the symmetrically shaped rib; and during the relay installation, the inverted protruding block is inserted into the through hole to form an inverted protruding block-through hole snap-fitting contact. By additionally providing the inverted protruding block-through hole snap-fitting contact combined structure between the angle adjustment knob and the bidirectional connection block, the through hole on the shaft body of the angle adjustment knob can pass through the motor shell to be accurately and reliably inserted on the inverted protruding block of the bidirectional connection block in a unique position manner to form a snap-fitting relay connection in a relay manner during the relay installation of the assembly line of the electric fan factory. In addition, after the relay installation is completed and the angle adjustment knob is released from the factory, it can solve the problem of poor smooth insertion structure setting that the angle adjustment knob often becomes loose and falls off during transportation and daily use when the user twists the angle adjustment knob back and forth. Thus, the manual-adjustment-type device for adjusting a swing angle of an electric fan according to identifications is formed, which not only meets the relevant safety regulations in the electric fan industry, but also ensures the angle adjustment knob not to become loose and fall off in daily use.

As a further improvement of the preferable structure of the above angle adjustment knob relay connection device, the asymmetrically shaped grooves are staggered at an angle to each other along the circumferential direction of the symmetrically shaped groove, one asymmetrically shaped groove is a square groove and another asymmetrically shaped groove is a circular arc groove. The asymmetrically shaped ribs are staggered at an angle to each other along the circumferential direction of the symmetrically shaped rib, one asymmetrically shaped rib is a square rib and another asymmetrically shaped rib is a second circular arc rib, and a longitudinal length of the asymmetrically shaped square rib and the second circular arc rib is longer than a longitudinal length of the symmetrically shaped rib. Since the longitudinal length of the asymmetrically shaped square rib and the second circular arc rib is longer than the longitudinal length of the symmetrically shaped rib, during the relay insertion and installation of the angle adjustment knob, an assembly worker first inserts the asymmetrically shaped square groove and the circular arc groove on the shaft body of the angle adjustment knob into the asymmetrically shaped square rib and the second circular arc rib with a relatively longer length on the cylinder body of the bidirectional connection block in a unique alignment direction and a first in-place preferential introduction manner; and then in a subsequent press-in process, the through hole of the symmetrically shaped groove is pressed into the inverted protruding block of the symmetrically shaped rib with a shorter cylinder length of the bidirectional connection block in a second position manner so as to cause the plastic rebound thereof, and the inverted protruding block is inserted into the through hole to form the inverted protruding block-through hole snap-fitting contact. It has been found that the relay installation manner in which the length of the asymmetrical ribs is relatively long in a unique position and a first in-place preferential introduction manner can avoid the elastic deformation of the inverted protruding block of the bidirectional connection block from shooting off, thereby significantly improving the unique relay installation efficiency of the angle adjustment knob, and further being compatible with installation operating procedures in the electric fan industry.

BRIEF DESCRIPTION OF THE DRAWINGS

The above advantages of the present disclosure will become apparent and more readily appreciated from the following description of embodiments, taken in conjunction with the accompanying drawings, in which.

NUMERAL REFERENCES

1—identification disc; 2—angle adjustment knob; 3—motor shell; 4—bidirectional connection block; 5—central shaft; 6—hollow shaft; 7—upper shaft sleeve; 8—housing cover; 9—housing; 10—large gear; 11—first limiting sliding slot; 12—first inner cavity; 13—central gear; 14—crank; 15—limiting cover; 16—second limiting sliding slot; 17—sliding block; 18—rack; 19—lower shaft sleeve; 20—circular iterative step; 21—screw; 22—limiting slot; 23—limiting block; 24—spring; 25—first circular arc rib; 26—graded recessed and protruding bodies; 27—stepped protruding block; 28—second inner cavity; 29—extending sliding slot; 30—notch; 31—worm gear; 32—circular arc reinforcing sleeve; 33—worm shaft sleeve; 34—through hole; 35—inverted protruding block; 36—symmetrically shaped groove; 37—square groove; 38—circular arc groove; 39—symmetrically shaped rib; 40—square rib; and 41—second circular arc rib.

DETAILED DESCRIPTION OF THE EMBODIMENTS

Hereinafter, embodiments of the present disclosure will be described in detail with reference to FIG. 1 to FIG. 7.

The present disclosure relates to a manual-adjustment-type device for adjusting a swing angle of an electric fan according to identifications.

Other configurations and operations of the electric fan are known to those skilled in the art, and will not be described in detail herein, and the structure of the manual-adjustment-type device for adjusting a swing angle of an electric fan according to identifications will be described below.

With reference to FIG. 1 to FIG. 6, the manual-adjustment-type device for adjusting a swing angle of an electric fan according to identifications of the present disclosure includes a motor shell 3, an identification disc 1, an angle adjustment knob 2, a housing 9 provided with a worm shaft sleeve 33 and a lower shaft sleeve 19, a housing cover 8 provided with an upper shaft sleeve 7, a two-grade reduction mechanism, a hollow shaft 6, and a central shaft 5. A second-grade reduction mechanism of the two-grade reduction mechanism includes a worm gear 31 and a large gear 10, the large gear 10 is provided with a first inner cavity 12, the first inner cavity 12 is provided with a crank adjustment mechanism composed of a first limiting sliding slot 11, a sliding block 17, a rack 18, a crank 14, and a central gear 13, and an angular displacement of each grade identification provided on the identification disc 1 is equal to an angular displacement of each tooth of the central gear 13. A circular iterative step 20 is provided on an upper end of the hollow shaft 6, and an identification disc relay connection device with a unique positioning connection is arranged between the hollow shaft 6 and the identification disc 1. An angle adjustment knob relay connection device with a unique positioning connection is arranged between the central shaft 5 and the angle adjustment knob 2, and the angle adjustment knob relay connection device includes a bidirectional connection block 4 fixedly mounted on an upper end of the central shaft with a screw 21. A lower end of the large gear 10 is provided with a limiting cover 15, the limiting cover 15 is provided with a second limiting sliding slot 16, and the crank 14 passes through the second limiting sliding slot 16 to an outside of the large gear 10. A limiting slot 22—limiting block 23 mechanism is arranged between the identification disc 1 and the angle adjustment knob 2, the limiting slot 22—limiting block 23 mechanism includes a circular arc limiting slot 22 formed on the identification disc 1 and a limiting block 23 provided on the angle adjustment knob 2, the limiting block 23 is inserted into the limiting slot 22, and a given limiting stroke of the limiting slot 22 is equal to an effective limiting stroke of a given identification of the identification disc 1.

By additionally providing the limiting slot 22—limiting block 23 mechanism between the identification disc 1 and the angle adjustment knob 2, an internal-limiting blocking mechanism with the given limiting stroke is formed to replace a full-rotation non-blocking mechanism between an angle adjustment knob and a large round wheel in the prior art. During the angle adjustment, once the user twists the angle adjustment knob 2 with too much force or mistakenly operates in an opposite direction, the central gear 13 on a lower end of the central shaft 5 and the rack 18 of the sliding block 17 will meet a blocking surface of a limiting end of the first limiting sliding slot 11, and at this time, the limiting block 23 of the torsion input angle adjustment knob 2 firstly firmly blocks the angle adjustment knob 2 on a given limiting end surface of the limiting slot 22 of the identification disc 1 so as to stop the angle adjustment knob 2 and synchronously stop the overshoot action displacement of the central gear 13 at the lower ends of the central shaft 5 and the hollow shaft 6 and the rack 18 of the sliding block 17, thereby completely eliminating the wear of gear teeth between the central gear 13 and the rack 18 of the sliding block 17 caused by excessive force or disoperation for twisting the angle adjustment knob 2 in the structural arrangement.

With reference to FIG. 2, FIG. 3, FIG. 4, FIG. 5, and FIG. 10, the sliding block 17 is provided with a second inner cavity 28, an inner wall of the second inner cavity 28 is provided with the rack 18, and the central gear 13 is inserted into the second inner cavity 28 and engaged with the rack 18. An outer wall of the sliding block 17 is provided with graded recessed and protruding bodies 26, and the center distance between the graded recessed and protruding bodies 26 is equal to a pitch of teeth of the rack 18. A top end of the graded recessed and protruding bodies 26 is in a sliding fit with a slot wall of the first limiting sliding slot 11, and the slot wall of the first limiting sliding slot 11 is provided with a notch 30. A spring 24—first circular arc rib 25 setter device is provided in the first inner cavity 12 of the large gear 10, the first circular arc rib 25 setter passes through the notch 30 and is in elastic setting contact with the graded recessed and protruding bodies 26.

By additionally providing a row of graded recessed and protruding bodies 26 with the center distance equal to the pitch of teeth of the rack 18 on the outer wall of the sliding block 17, breaking a middle section of the conventional slot wall of the first limiting sliding slot 11 and providing the notch 30 thereon, and additionally providing an elastic setter device at the notch 30 to press the graded recessed and protruding bodies 26 in an elastic setting contact manner, the sliding block 17—rack 18—crank 14 can only be set and displaced in the first limiting sliding slot 11 according to the set center distance between the graded recessed and protruding bodies 26, thus forming a reciprocating sliding block 17—rack 18—crank 14 variable-length adjustment mechanism with the graded recessed and protruding bodies 26 defining the displacement track. Since the center distance between the graded recessed and protruding bodies 26 is equal to the pitch of teeth of the rack 18 of the sliding block 17, the pitch of teeth of the rack 18 of the sliding block 17 is equal to a pitch of teeth of the central gear 13, and the angular displacement of each tooth of the central gear 13 is equal to the angular displacement of each grade identification on the identification disc 1, the manual-adjustment-type device for adjusting a swing angle of an electric fan according to identifications is formed, by which the actual displacement length of the eccentric distance of the sliding block 17, the rack 18, and the crank 14 can be adjusted accurately and equally according to a given grade identification of the identification disc. The device has a compact and reasonable structure and conforms to safety regulations of the electric fan manufacturing industry.

A stepped protruding block 27 is provided between a lower end surface of the sliding block 17 and the crank 14, an extending sliding slot 29 is formed along the second limiting sliding slot 16 on the limiting cover 15, the stepped protruding block 27 is inserted into the extending sliding slot 29 to form a sliding fit, and the limiting cover 15 is mounted on the large gear 10 to close the first inner cavity 12. By additionally providing the stepped protruding block 27 between the lower end surface of the sliding block 17 and the crank 14, additionally providing the extending sliding slot 29 along the second limiting sliding slot 16 on the limiting cover 15, and inserting the stepped protruding block 27 into the extending sliding slot 29 to form a sliding fit, a single sliding block 17—double plane-double sliding slot linear guide snap-fitting structure, which includes first limiting sliding slot 11—sliding block 17 and extending sliding slot 29—stepped protruding block 27, is formed in the sliding block 17—rack 18—crank 14 variable-length adjustment mechanism, thereby enhancing the vertical stability of the snap fitting of the crank 14, reducing the influence of the transverse torsion of the central gear 13 during the angle adjustment, and improving the impact resistance of the crank 14 against external impacts. The rack 18 and the central gear 13 are more reliably protected from the wear of gear teeth even when the crank 14 encounters an overload external impact.

With reference to FIG. 2, FIG. 3, FIG. 6, FIG. 9, and FIG. 10, a circular arc reinforcing sleeve 32 is provided in a lower section wall of the worm shaft sleeve 33 of the housing 9 along the non-engaging portion of the addendum-circle surface of the worm gear 31, and a circular arc surface of the circular arc reinforcing sleeve 32 is in a movable fit with the corresponding addendum-circle surface of the worm gear 31. In this way, the engaging stability of the worm gear 31 with the large gear 10 is enhanced. The problem that the engagement of the worm gear 31 with the large gear 10 is of low stability due to a distal end thereof being single-ended cantilevered so that the instability and slipping of the engagement are easily generated during the manual-twisting angle adjustment is solved. Thus, the manual-adjustment-type device for adjusting a swing angle of an electric fan according to identifications maintains good power transmission performance and smooth and accurate angle adjustment function during operation.

With reference to FIG. 2, FIG. 3, FIG. 4, FIG. 7, and FIG. 8, in the angle adjustment knob 2 relay connection device, a shaft body of the angle adjustment knob 2 is provided with a symmetrically shaped groove 36 and asymmetrically shaped grooves, and a through hole 34 is arranged on the shaft body at the symmetrically shaped groove 36; a cylinder body of the above bidirectional connection block 4 is provided with a symmetrically shaped rib 39 and asymmetrically shaped ribs, and an inverted protruding block 35 is provided in the corresponding through hole of the symmetrically shaped rib 39; and during the relay installation, the inverted protruding block 35 is inserted into the through hole 34 to form an inverted protruding block 35—through hole 34 snap-fitting contact. By additionally providing the inverted protruding block 35—through hole 34 snap-fitting contact combined structure between the angle adjustment knob and the bidirectional connection block, the through hole 34 on the shaft body of the angle adjustment knob 2 can pass through the motor shell 3 to be accurately and reliably inserted on the inverted protruding block 35 of the bidirectional connection block 4 in a unique position manner to form a snap-fitting relay connection in a relay manner during the relay installation of the assembly line of the electric fan factory. In addition, after the relay installation is completed and the angle adjustment knob is released from the factory, it can solve the problem of poor smooth insertion structure setting that the angle adjustment knob often becomes loose and falls off during transportation and daily use when the user twists the angle adjustment knob back and forth. Thus, the manual-adjustment-type device for adjusting a swing angle of an electric fan according to identifications is formed, which not only meets the relevant safety regulations in the electric fan industry, but also ensures the angle adjustment knob 2 not to become loose and fall off in daily use.

Figure 1:
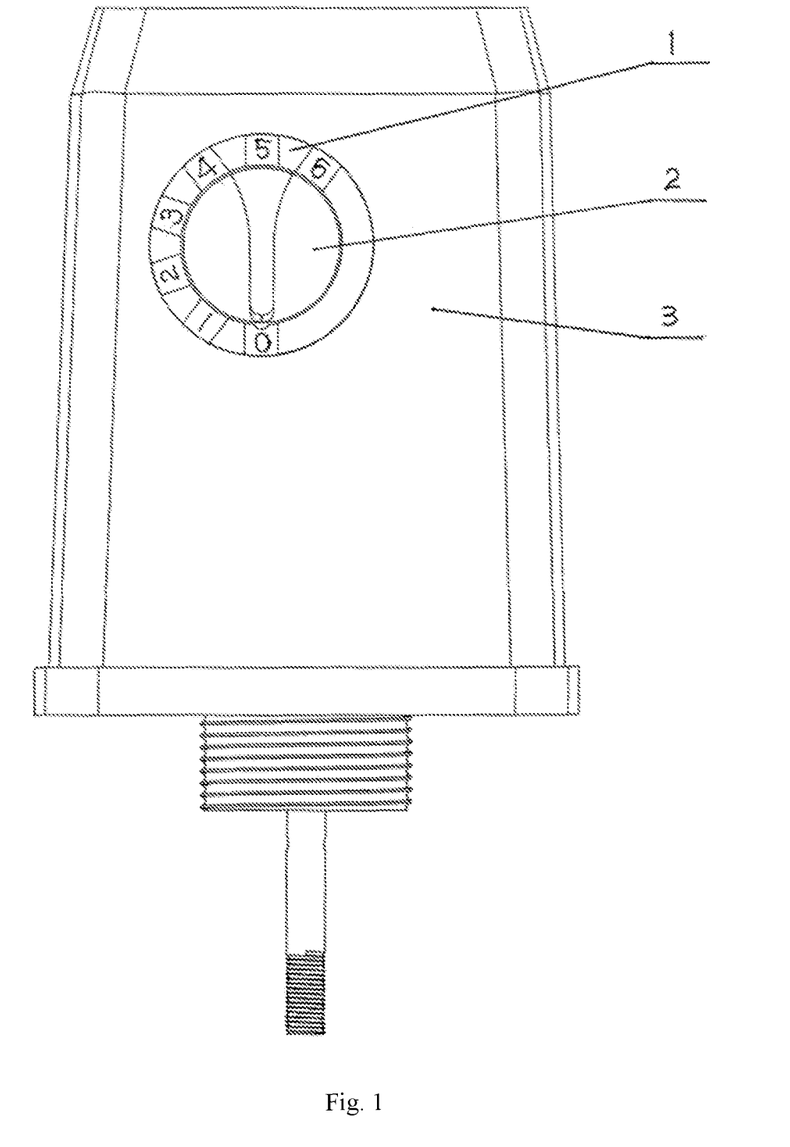
FIG. 1 is a top view of a general assembly of a manual-adjustment-type device for adjusting a swing angle of an electric fan according to identifications of an embodiment of the present disclosure.
Figure 2:
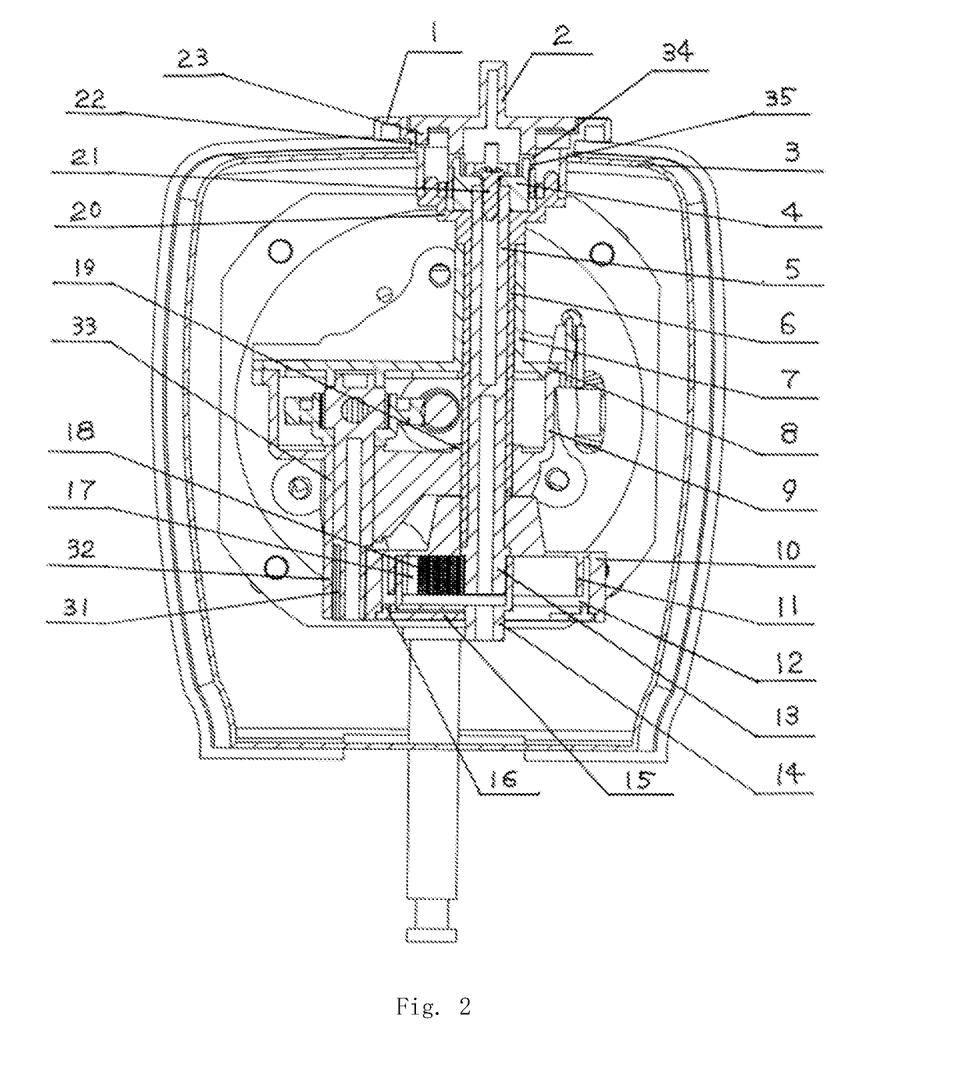
FIG. 2 is a cross-sectional view of the embodiment of FIG. 1.
Figure 3:
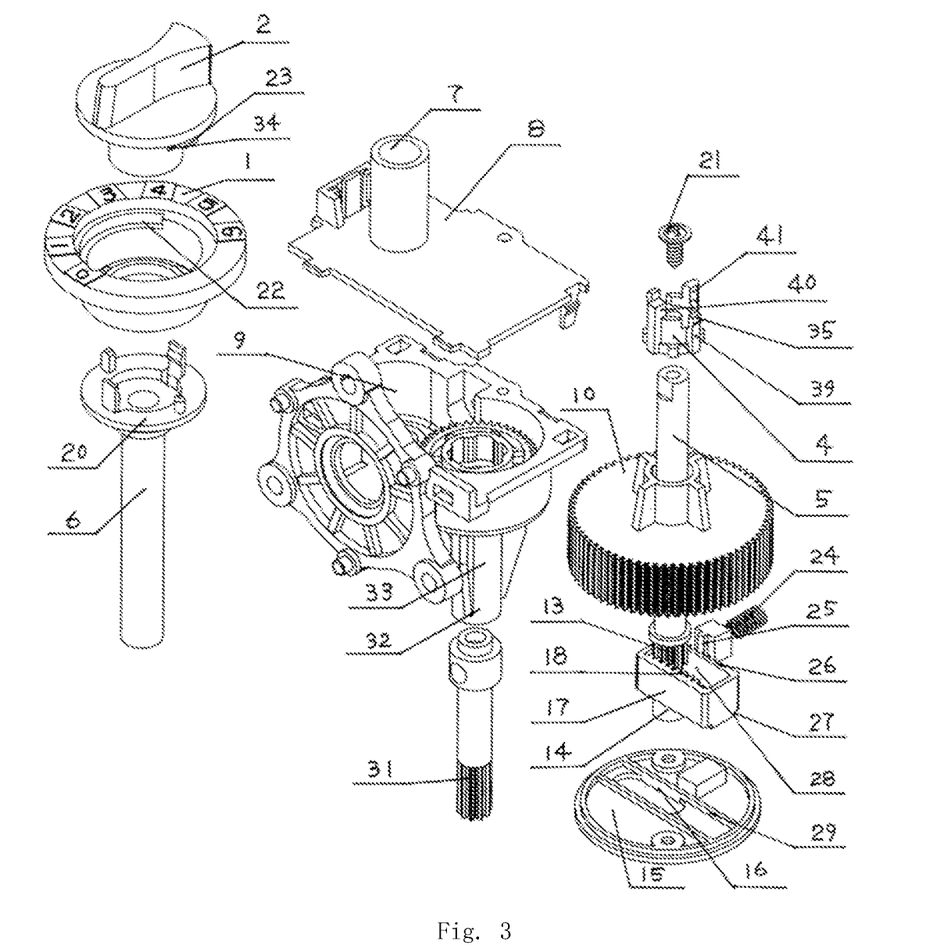
FIG. 3 is an exploded view of a variable angle gearbox assembly, an identification disc, and an angle adjustment knob of the embodiment of FIG. 1.
Figure 4:
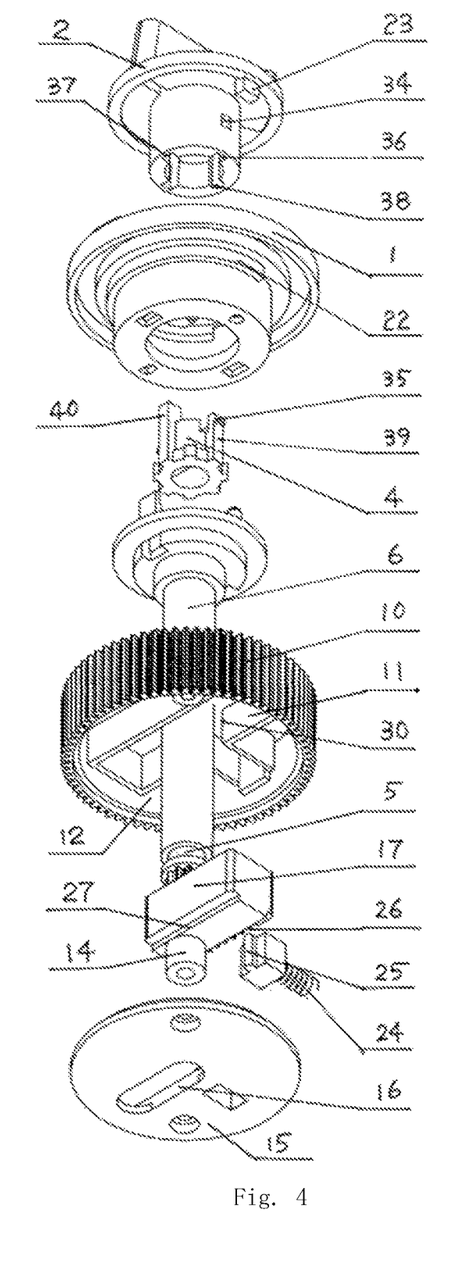
FIG. 4 is a top exploded view of an angle adjustment component of FIG. 3.
Figure 5:
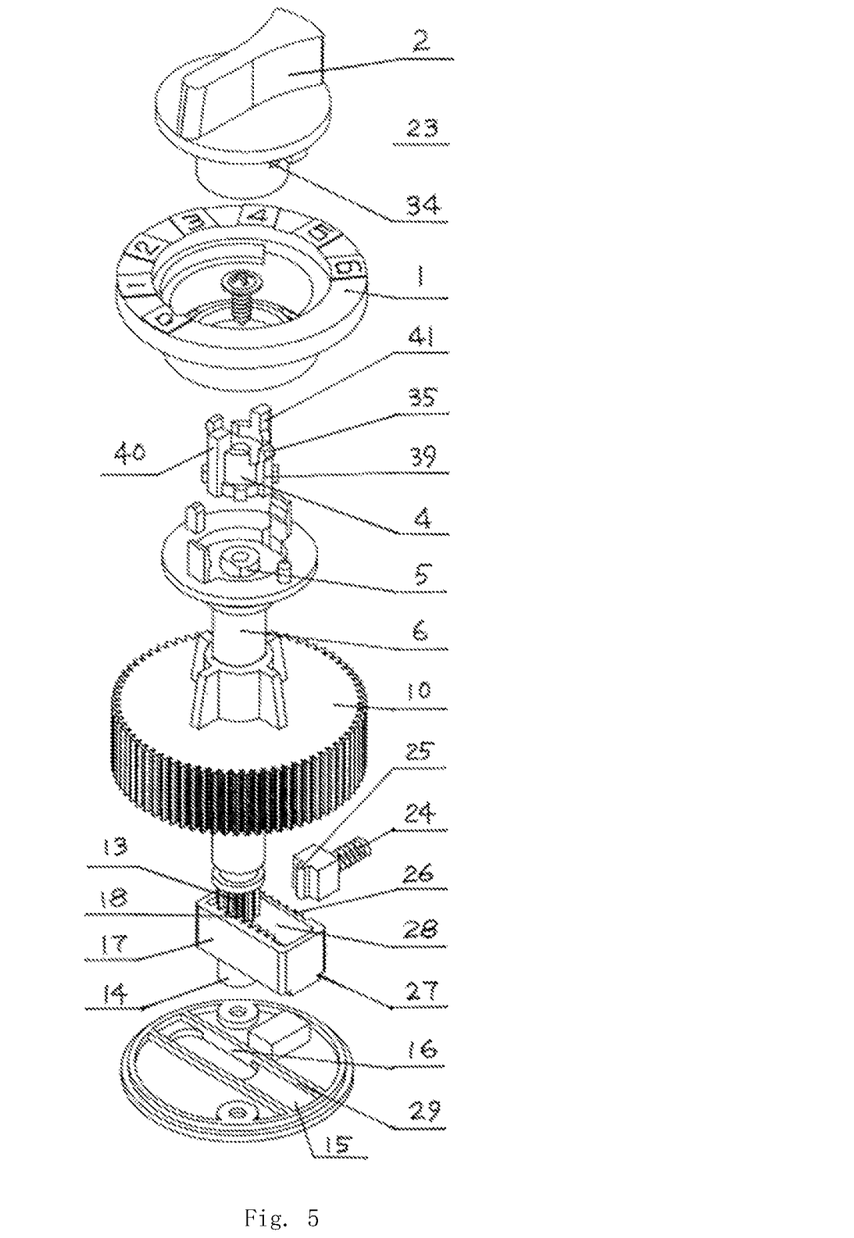
FIG. 5 is a bottom exploded view of an angle adjustment component of FIG. 3.
Figure 6:
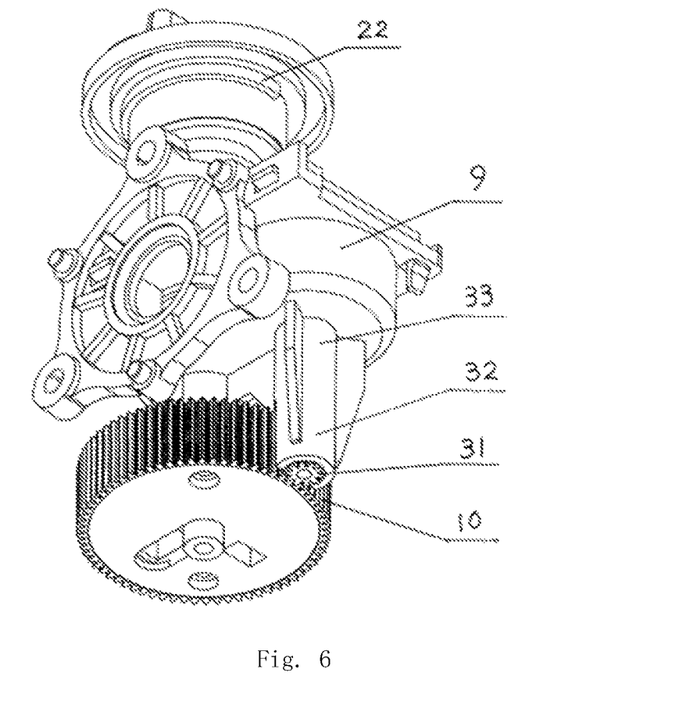
FIG. 6 is an external view of a variable angle gearbox assembly, an identification disc, and an angle adjustment knob of the embodiment of FIG. 1.
Figure 7:
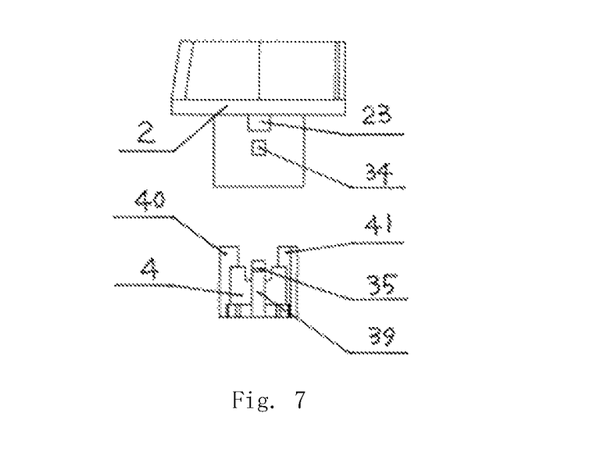
FIG. 7 is an exploded right-side view of an angle adjustment knob and a bidirectional connection block of the embodiment of FIG. 1.
Figure 8:
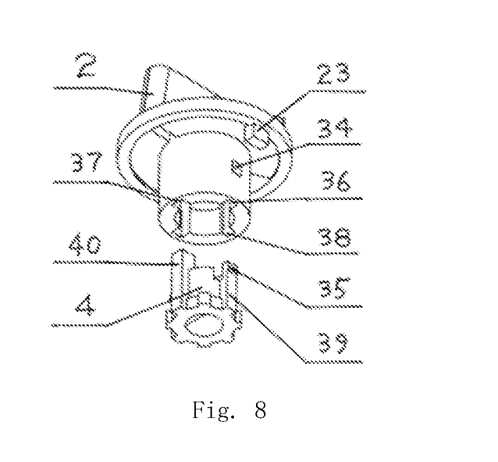
FIG. 8 is an exploded external view of an angle adjustment knob and a bidirectional connection block of the embodiment of FIG. 1.
Figure 9:
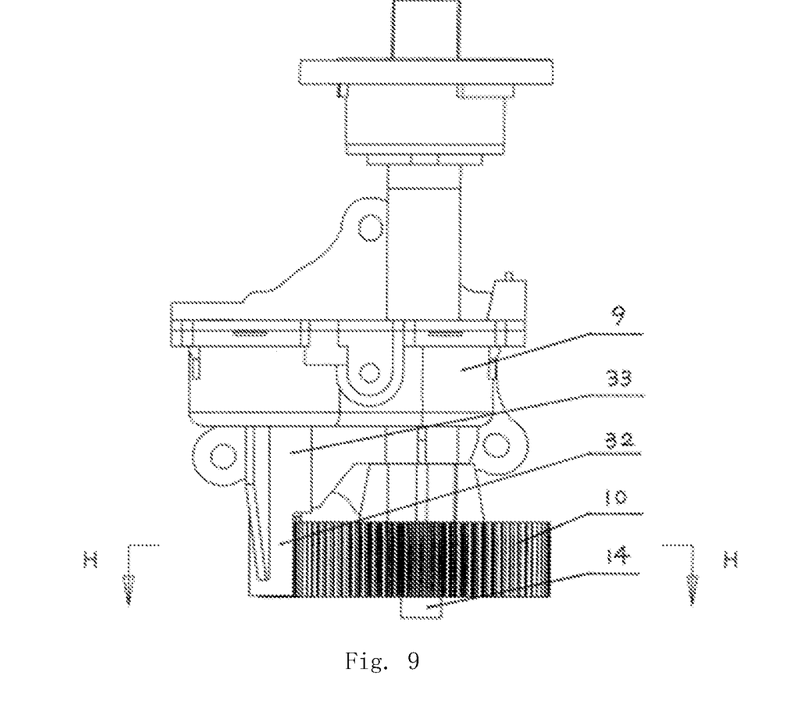
FIG. 9 is a rear view of a variable angle gearbox assembly of the embodiment of FIG. 1.
Figure 10:
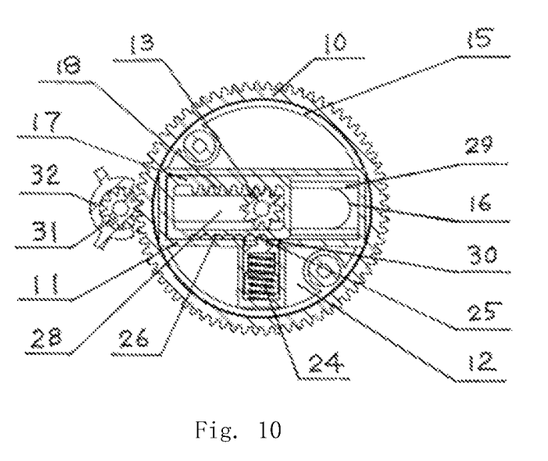
FIG. 10 is a cross-sectional view of FIG. 9 along a line H-H.

The asymmetrically shaped grooves are staggered at 90° to each other along the circumferential direction of the symmetrically shaped groove 36, one asymmetrically shaped groove is a square groove 37 and another asymmetrically shaped groove is a circular arc groove 38. The asymmetrically shaped ribs are staggered at 90° to each other along the circumferential direction of the symmetrically shaped rib 39, one asymmetrically shaped rib is a square rib 40 and another asymmetrically shaped rib is a second circular arc rib 41, and a longitudinal length of the asymmetrically shaped square rib 40 and the second circular arc rib 41 is longer than a longitudinal length of the symmetrically shaped rib 39. Since the longitudinal length of the asymmetrically shaped square rib 40 and the second circular arc rib 41 is longer than the longitudinal length of the symmetrically shaped rib 39, during the relay insertion and installation of the angle adjustment knob 2, an assembly worker first inserts the asymmetrically shaped square groove 37 and the circular arc groove 38 on the shaft body of the angle adjustment knob 2 into the asymmetrically shaped square rib 40 and the second circular arc rib 41 with a relatively longer length on the cylinder body of the bidirectional connection block 4 in a unique alignment direction and a first in-place preferential introduction manner; and then in a subsequent press-in process, the through hole 34 of the symmetrically shaped groove 36 is pressed into the inverted protruding block 35 of the symmetrically shaped rib 39 with a shorter cylinder length of the bidirectional connection block 4 in a second position manner so as to cause the plastic rebound thereof, and the inverted protruding block is inserted into the through hole 34 to form the inverted protruding block 35—through hole 34 snap-fitting contact. It has been found that the relay installation manner in which the length of the asymmetrical ribs is relatively long in a unique position and a first in-place preferential introduction manner can avoid the elastic deformation of the inverted protruding block 35 of the bidirectional connection block 4 from shooting off, thereby significantly improving the unique relay installation efficiency of the angle adjustment knob 2, and further being compatible with installation operating procedures in the electric fan industry.

In view of the above, the manual-adjustment-type device for adjusting a swing angle of an electric fan according to identifications proposed by the present disclosure has the following beneficial implications.

1. The limiting slot 22—limiting block 23 mechanism is additionally provided between the identification disc 1 and the angle adjustment knob 2, so that the wear of gear teeth is eliminated when the user operates.

2. By the component optimization design of the sliding block 17, the mechanical component elements such as the second inner cavity 28 on the inner wall, the rack 18, the graded recessed and protruding bodies 26 on the outer wall, the stepped protruding block 27, and the crank 14 are integrated to form a mechanical MCU component, which can equally input the preset value according to the average identification of the identification disc 1, drive the eccentric distance of the rack 18 and the crank 14 to make equivalent displacement according to the preset value, and can also equally feedback the trinity MCU component function of the sampling value according to the given memory data after the crank 14 is angled. Thus, the three equivalent requirements of manual adjustment, i.e., equivalent input, equivalent driving, and equivalent control are met according to the average identification of the identification disc 1, achieving the purpose of accurate and equivalent angle adjustment according to identifications on the identification disc 1.

3. In terms of costs, multi-functional components such as the rack 18 on the inner wall of the second inner cavity 28 of the sliding block 17, the graded recessed and protruding bodies 26 on the outer wall, the stepped protruding block 27, and the crank 14 are integrated to produce a single component, thereby optimizing the combined structure of the first limiting sliding slot 11—notch 30 and the spring 24—first circular arc rib 25, eliminating an axial rivet and simplifying the assembly process, reducing the costs of work materials, and optimizing the overall cost-performance ratio for accurate and equivalent angle adjustment according to identifications on the identification disc 1.

4. In daily use, the inverted protruding block 35—through hole 34 snap-fitting contact combined mechanism is additionally provided between the angle adjustment knob 2 and the bidirectional connection block 4 to solve the problem that the angle adjustment knob 2 of the electric fan will become loose and fall off in daily use.

In the manual-adjustment-type device for adjusting a swing angle of an electric fan according to identifications of the present disclosure, the spring-setter device is provided between the graded recessed and protruding bodies and the inner cavity of the large gear, and the specific shape of the setter is not limited to the first circular arc rib shown in the above embodiment, but may also be a setter of other suitable shapes, and such partial changes in the specific shape of the setter fall within the scope of protection of the present disclosure. The above embodiments are only part of, but not all embodiments of the present disclosure, and all other embodiments obtained by those skilled in the art without inventive effort based on embodiments of the present disclosure fall within the scope of the present disclosure.

The invention claimed is:

1. A manual-adjustment-type device for adjusting a swing angle of an electric fan according to identifications, comprising a motor shell, an identification disc, an angle adjustment knob, a housing provided with a worm shaft sleeve and a lower shaft sleeve, a housing cover provided with an upper shaft sleeve, a two-grade reduction mechanism, a hollow shaft, and a central shaft; a second-grade reduction mechanism of the two-grade reduction mechanism comprising a worm gear and a large gear, the large gear being provided with a first inner cavity, and the first inner cavity being provided with a crank adjustment mechanism composed of a first limiting sliding slot, a sliding block, a rack, a crank, and a central gear; an angular displacement of each grade identification provided on the identification disc being equal to an angular displacement of each tooth of the central gear; a circular iterative step being provided on an upper end of the hollow shaft, and an identification disc relay connection device with a unique positioning connection being arranged between the hollow shaft and the identification disc; an angle adjustment knob relay connection device with a unique positioning connection being arranged between the central shaft and the angle adjustment knob, and the angle adjustment knob relay connection device comprising a bidirectional connection block fixedly mounted on an upper end of the central shaft with a screw; a lower end of the large gear being provided with a limiting cover, the limiting cover being provided with a second limiting sliding slot, and the crank passing through the second limiting sliding slot to an outside of the large gear; and a limiting slot-limiting block mechanism being arranged between the identification disc and the angle adjustment knob.

2. The device according to claim 1, wherein the limiting slot-limiting block mechanism comprises a circular arc limiting slot formed on the identification disc and a limiting block provided on the angle adjustment knob, and the limiting slot is inserted in the limiting block.

3. The device according to claim 1, wherein the sliding block is provided with a second inner cavity, an inner wall of the second inner cavity is provided with the rack, and the central gear is inserted into the second inner cavity and engaged with the rack; an outer wall of the sliding block is provided with graded recessed and protruding bodies, and the center distance between the graded recessed and protruding bodies is equal to a pitch of teeth of the rack; a top end of the graded recessed and protruding bodies is in a sliding fit with a slot wall of the first limiting sliding slot, and the slot wall of the first limiting sliding slot is provided with a notch; and a spring-setter device is provided in the first inner cavity of the large gear, and a setter of the spring-setter device passes through the notch and is in elastic setting contact with the graded recessed and protruding bodies.

4. The device according to claim 3, wherein one end of the setter of the spring-setter device is a first circular arc rib and another end of the setter of the spring-setter device is a square block, and the first circular arc rib of the setter of the spring-setter device passes through the notch and is in elastic setting contact with the graded recessed and protruding bodies.

5. The device according to claim 1, wherein a stepped protruding block is provided between a lower end surface of the sliding block and the crank, an extending sliding slot is formed along the second limiting sliding slot on the limiting cover, and the stepped protruding block is inserted into the extending sliding slot to form a sliding fit.

6. The device according to claim 1, wherein a circular arc reinforcing sleeve is provided in a lower section wall of the worm shaft sleeve of the housing along the non-engaging portion of the addendum-circle surface of the worm gear, and a circular arc surface of the circular arc reinforcing sleeve is in a movable fit with the corresponding addendum-circle surface of the worm gear.

7. The device according to claim 1, wherein a shaft body of the angle adjustment knob is provided with a symmetrically shaped groove and asymmetrically shaped grooves, and a through hole is arranged on the shaft body at the symmetrically shaped groove; a cylinder body of the bidirectional connection block is provided with a symmetrically shaped rib and asymmetrically shaped ribs, and an inverted protruding block is provided in the corresponding through hole of the symmetrically shaped rib; and the inverted protruding block is inserted into the through hole to form an inverted protruding block-through hole snap-fitting contact.

8. The device according to claim 7, wherein the asymmetrically shaped grooves are staggered at an angle to each other along the circumferential direction of the symmetrically shaped groove, one asymmetrically shaped groove is a square groove and another asymmetrically shaped groove is a circular arc groove; and the asymmetrically shaped ribs are staggered at an angle to each other along the circumferential direction of the symmetrically shaped rib, one asymmetrically shaped rib is a square rib and another asymmetrically shaped rib is a second circular arc rib, and a longitudinal length of the asymmetrically shaped square rib and the second circular arc rib is longer than a longitudinal length of the symmetrically shaped rib.

* * * * *